(12) United States Patent
Garnaud et al.

(10) Patent No.: US 11,738,878 B2
(45) Date of Patent: Aug. 29, 2023

(54) SUSPENSION ASSEMBLY FOR A TURBINE ENGINE

(71) Applicant: SAFRAN AIRCRAFT ENGINES, Paris (FR)

(72) Inventors: Quentin Matthias Emmanuel Garnaud, Moissy-Cramayel (FR); Antoine Elie Hellegouarch, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 246 days.

(21) Appl. No.: 17/283,863

(22) PCT Filed: Oct. 4, 2019

(86) PCT No.: PCT/FR2019/052355
§ 371 (c)(1),
(2) Date: Apr. 8, 2021

(87) PCT Pub. No.: WO2020/074811
PCT Pub. Date: Apr. 16, 2020

(65) Prior Publication Data
US 2021/0380265 A1    Dec. 9, 2021

(30) Foreign Application Priority Data
Oct. 8, 2018  (FR) ...................................... 1859297

(51) Int. Cl.
*B64D 27/26* (2006.01)
*B64D 27/16* (2006.01)

(52) U.S. Cl.
CPC ............. *B64D 27/26* (2013.01); *B64D 27/16* (2013.01); *B64D 2027/266* (2013.01)

(58) Field of Classification Search
CPC ... B64D 27/26; B64D 27/16; B64D 2027/266
See application file for complete search history.

(56) References Cited

U.S. PATENT DOCUMENTS 3,592,421 A * 7/1971 Kopp ..................... B64D 27/26
244/54
4,079,981 A * 3/1978 Mahler .................. B64D 27/26
244/54
(Continued)

FOREIGN PATENT DOCUMENTS

FR    2 799 432 A1    4/2001
FR    2 867 155 A1    9/2005

OTHER PUBLICATIONS

International Patent Application No. PCT/FR2019/052355, International Search Report and Written Opinion dated Dec. 13, 2019, 13 pgs.
(Continued)

*Primary Examiner* — Christopher D Hutchens
*Assistant Examiner* — Steven J Shur
(74) *Attorney, Agent, or Firm* — Cozen O'Connor

(57) ABSTRACT

The invention concerns a suspension system (7) for a turbomachine, comprising a beam (10) intended to be attached to a pylon of an aircraft, and a cylindrical part (15) articulated on a ball joint housing, the ball joint housing comprising a body (11), and a ball joint nut (16) articulated on the body (11), the cylindrical part (15) being mounted so as to pivot about its axis in the ball joint nut, characterized in that the cylindrical part (15) is intended to be integral with a fixed part (8) of the turbomachine (1), the body (11) of the ball joint housing being integral with the beam (10).

20 Claims, 3 Drawing Sheets

(56) References Cited

U.S. PATENT DOCUMENTS

| | | | | |
|---|---|---|---|---|
| 4,943,013 | A * | 7/1990 | Kapala | F16B 39/10 |
| | | | | 244/54 |
| 5,927,644 | A * | 7/1999 | Ellis | B64D 27/26 |
| | | | | 60/797 |
| 6,474,596 | B1 * | 11/2002 | Cousin | B64D 27/26 |
| | | | | 244/54 |
| 7,325,770 | B2 * | 2/2008 | Chevalier | F16C 23/10 |
| | | | | 244/54 |
| 9,592,917 | B2 * | 3/2017 | Cassagne | B64D 27/12 |
| 10,464,685 | B2 * | 11/2019 | Whiteford | B64D 27/26 |
| 2011/0127369 | A1 * | 6/2011 | Dussol | B64D 27/18 |
| | | | | 244/54 |
| 2012/0080555 | A1 * | 4/2012 | Lafont | B64D 27/26 |
| | | | | 244/54 |
| 2014/0174056 | A1 * | 6/2014 | Suciu | F01D 9/02 |
| | | | | 60/226.1 |
| 2016/0076401 | A1 * | 3/2016 | Besnard | F16C 11/0614 |
| | | | | 248/666 |
| 2017/0102026 | A1 * | 4/2017 | Florent | F16C 11/045 |

OTHER PUBLICATIONS

French Patent Application No. FR1859297, Search Report dated May 2, 2019; 10 pgs.

* cited by examiner

SUSPENSION ASSEMBLY FOR A TURBINE ENGINE

CROSS-REFERENCE TO RELATED APPLICATIONS

This application is a 35 U.S.C. § 371 filing of International Application No. PCT/FR2019/052355 filed Oct. 4, 2019, which claims the benefit of priority to French Patent Application No. 1859297 filed Oct. 8, 2018, each of which is incorporated herein by reference in its entirety.

FIELD OF THE INVENTION

The present invention concerns a suspension system for a turbomachine, in particular for a double-flow turbojet.

BACKGROUND OF THE INVENTION

A double-flow turbojet typically comprises a flow vein of a primary flow or primary vein with, from upstream to downstream in the direction of flow of the gas within the turbomachine, a low-pressure compressor, a high-pressure compressor, a combustion chamber, a high-pressure turbine and a low-pressure turbine. The turbojet also comprises a flow vein of a secondary flow or secondary vein, located radially outside the primary vein. The terms 'axial' and 'radial' are defined with respect to the X axis. The terms 'upstream' and 'downstream' are defined with respect to the gas flows through the turbomachine.

The turbojet is usually attached to a pylon or mast of an aircraft, the pylon itself being attached to the aircraft structure, such as the wing. The pylon allows the forces generated by the turbojet to be transmitted to the aircraft structure and also allows the routing of fuel, air, electrical and hydraulic systems between the turbojet and the aircraft.

Patent application FR 2 867 155 on behalf of the Applicant discloses a turbomachine attached to a pylon by means of a suspension system comprising an upstream suspension system and a downstream suspension system. The upstream suspension system is attached to an intermediate casing integral with a fan casing, the downstream suspension system being attached to an exhaust casing. Both casings are structural elements of the turbomachine.

The function of a suspension system is to ensure the transmission of mechanical forces between the turbomachine and the pylon. These forces are in particular the thrust generated by the turbomachine, oriented according to the axis of the turbomachine noted X, the lateral aerodynamic loads, oriented according to an axis noted Y and the weight of the turbomachine, oriented vertically according to an axis noted Z. The X, Y and Z axes are orthogonal two by two.

In the following description, particular attention will be paid to the upstream suspension system.

Such a known upstream suspension assembly typically comprises a beam intended to be attached to a pylon of an aircraft, a cylindrical part articulated to a ball joint housing, the ball joint housing comprising a body, a ball joint nut articulated on body, the cylindrical part being mounted so as to pivot about its axis in the ball joint nut. The body of the ball joint housing is attached to a fixed part of the turbojet, for example an intermediate housing or an inter-compressor housing, located between the low-pressure compressor and the high-pressure compressor of the primary vein.

There is currently a need to increase the dilution ratio of turbojets. It will be remembered that the dilution ratio is the ratio of the secondary flow rate to the primary flow rate. In order to increase the dilution ratio, it is therefore necessary to increase the cross-section of the secondary vein, which requires, in particular, a reduction in the dimensions of the upstream suspension system, especially in the area where it is attached to the corresponding casing in the turbomachine area.

SUMMARY OF THE INVENTION

The invention aims to remedy these various constraints in a simple, reliable and inexpensive way.

To this end, the invention relates to a suspension system for a turbomachine, comprising a beam intended to be attached to a pylon of an aircraft, and a cylindrical part articulated on a ball joint housing, the ball joint housing comprising a body and a ball joint nut articulated on the body, the cylindrical part being mounted so as to pivot about its axis in the ball joint nut, characterized in that the cylindrical part is intended to be integral with a fixed part of the turbomachine, the body of the ball joint housing being integral with the beam.

The cylindrical part has a diameter which is smaller than the dimensions of the body of the ball joint housing, so that the said cylindrical part can be attached in an area of the turbomachine which has a small space available for such an attachment, for example in an intermediate casing of the turbomachine.

The turbomachine can be a turbojet, in particular a double-flow turbojet.

The suspension system does not belong to the turbomachine.

The body of the ball joint housing may be integral with at least a part of the beam.

The beam can be formed from at least two parts that are connected to each other, for example by screwing or bolting. The said parts of the beam can be symmetrical to each other.

In this way, if a crack propagates in one part of the beam, the crack does not damage the other part of the beam, which can continue to perform its function fully.

The cylindrical part may be mounted, at least in part, in a housing of the body, a clearance being provided between the said cylindrical part and the body.

The clearance between the cylindrical part and the body, oriented perpendicularly to the axis of the cylindrical part, is for example between 1 and 10 mm.

The clearance oriented according to the axis of the cylindrical part, between said cylindrical part and the body, is for example between 1 and 10 mm.

Such clearances can allow rotation of the cylindrical part according to two axes of rotation orthogonal to the axis of the said cylindrical part. The rotation allowed by these clearances, of the cylindrical part in the body, according to each of these two axes, is for example limited to an angle value between 2° and 10°.

The system can comprise a connecting element mounted in the body and mounted with clearance in the cylindrical part, said clearance being permitted in particular according to the direction of the axis of the cylindrical part.

The connecting element is, for example, cylindrical and can be mounted in cylindrical holes of the cylindrical part and of the beam. The said connecting element is thus configured to implement a Fail-Safe function. The connecting element is able to transmit forces, by contact with the cylindrical part and/or with the beam, in the event of taking up the aforementioned play due to a failure. This clearance is for example between 1 and 10 mm.

The beam can have an upstream part at which the ball joint housing is located, and a downstream part for attaching a spreader bar to support force-recovery rods.

The spreader bar can be articulated on the downstream part of the beam. The spreader bar may have two ends circumferentially offset from each other. Each rod can have a first end articulated on one of the circumferential ends of the spreader bar and a second end to a fixed part of the turbomachine.

The cylindrical part can comprise a collar, the said collar being intended to be attached to the fixed part of the turbomachine.

Such an attachment is, for example, provided by means of at least one bolt or at least one screw.

The cylindrical part can comprise at least one recessed area facing the screw, said recessed area being located downstream of the collar.

The recessed area allows the engagement of a screw, in particular the screw head and/or the corresponding screwing tool, for the purpose of attaching the cylindrical part to the fixed part of the turbomachine.

The cylindrical part may have a cylindrical upstream end located upstream of the collar.

The said upstream end is capable of engaging in a housing of complementary shape in the fixed part of the turbomachine, so as to provide centring and/or force transfer between the said cylindrical part and the said fixed part of the turbomachine.

The invention also relates to a double-flow turbojet comprising a flow path of a primary flow, known as the primary vein, delimited by a radially internal wall and a radially external wall, and a flow vein of a secondary flow, known as the secondary vein, surrounding the primary flow path and delimited by a radially internal wall and a radially external wall, characterized in that it comprises a suspension system of the abovementioned type, and in that the cylindrical part is attached to a fixed part of the turbojet, situated radially between the internal wall of the secondary flow path and the external wall of the primary vein, the said fixed part being integral with at least one of the said walls.

The said fixed part may extend radially inward from the internal wall of the secondary vein. The said fixed part may be integral with the internal wall of the secondary vein.

The secondary vein may comprise at least one arm extending radially between the internal and external walls of the secondary vein, the said arm being located downstream of a fan of the turbojet, the fixed part to which said cylindrical part is attached being located axially opposite the arm.

The dilution ratio of the said turbojet may be greater than 10.

The invention will be better understood and other details, characteristics and advantages of the invention will appear when reading the following description, which is given as a non-limiting example, with reference to the attached drawings.

DETAILED DESCRIPTION

Figure 1:
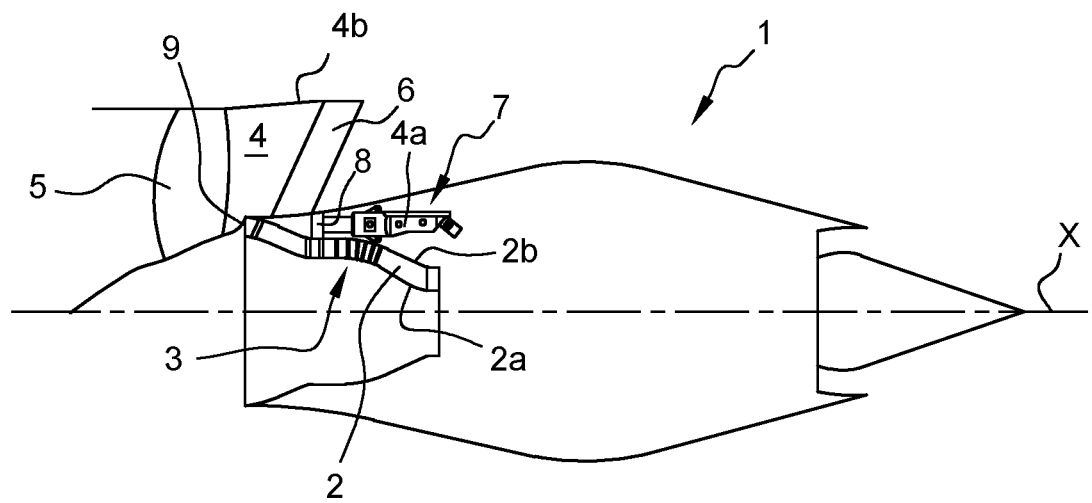
FIG. 1 is an axial sectional view of a part of a double-flow turbojet according to one embodiment of the invention.

FIG. 1 shows a double-flow turbojet 1 according to an embodiment of the invention. The latter extends according to an X axis. In the remainder of the description, the terms 'axial' and 'radial' are defined with respect to the X axis. The turbojet 1 comprises a flow vein of a primary flow or primary vein 2 comprising, from upstream to downstream in the direction of circulation of the gas flow within the turbomachine, a low-pressure compressor 3, a high-pressure compressor, a combustion chamber, a high-pressure turbine and a low-pressure turbine. Only the low pressure compressor 3 is shown. The turbojet 1 also comprises a flow vein of a secondary flow or secondary vein 4, located radially outside the primary vein 2.

The terms 'upstream' and 'downstream' are defined with respect to the gas flows within the turbojet 1.

The primary vein 2 is delimited by a radially internal wall 2a and a radially external wall 2b. Similarly, the secondary vein 4 is delimited by a radially internal wall 4a and a radially external wall 4b. A fan 5 is located upstream of the primary and secondary veins 2, 4. The secondary vein 4 comprises at least one arm 6 extending radially between the internal wall 4a and the external wall 4b of the secondary vein 4, said arm 6 thus being located downstream of the fan 5. The said arm 6 may be inclined with respect to the radial direction.

The turbojet 1 is attached to a pylon (or mast, not shown) of an aircraft, the said pylon itself being attached to the structure of the aircraft, such as the wing. The pylon is used to transmit the forces generated by the turbojet 1 to the aircraft structure and also allows the routing of fuel, air, electrical and hydraulic systems between the turbojet 1 and the aircraft.

In particular, the turbojet 1 is attached to the pylon via an upstream suspension system 7 and a downstream suspension system.

The upstream suspension system 7 is attached to an intermediate casing, the said intermediate casing forming in particular part of the walls 2a, 2b, 4a and 4b. The downstream suspension system is attached to an exhaust casing.

In particular, the upstream suspension system 7 is attached at an interface 8 located radially between the internal wall 4a of the secondary vein 4 and the external wall 2b of the primary vein 2, the said interface 8 being integral with at least one of said walls 4a, 2b or integrally formed with at least one of said walls 4a, 2b. The interface 8 is therefore a fixed part of the turbomachine.

The interface 8 can be located axially opposite the arm 6 of the secondary flow vein 4 and/or opposite the low pressure compressor 3 of the primary flow vein 2.

Note that the interface 8 is located in the vicinity of an upstream connection area 9 between the external wall 2b of the primary vein 2 and the internal wall 4a of the secondary vein 4.

The dilution ratio of the turbojet 1 is relatively high or even very high, for example between 10 and 20. The cross-section of the secondary vein 4 is therefore high, and the space available in the vicinity of the said connection area 9 is radially limited.

The invention makes it possible to ensure the attachment of the upstream suspension system 7 in an area with reduced radial dimensions.

For this purpose, the said suspension system 7 comprises a beam 10 intended to be attached to a pylon of an aircraft, for example by screwing or bolting.

Figure 2:
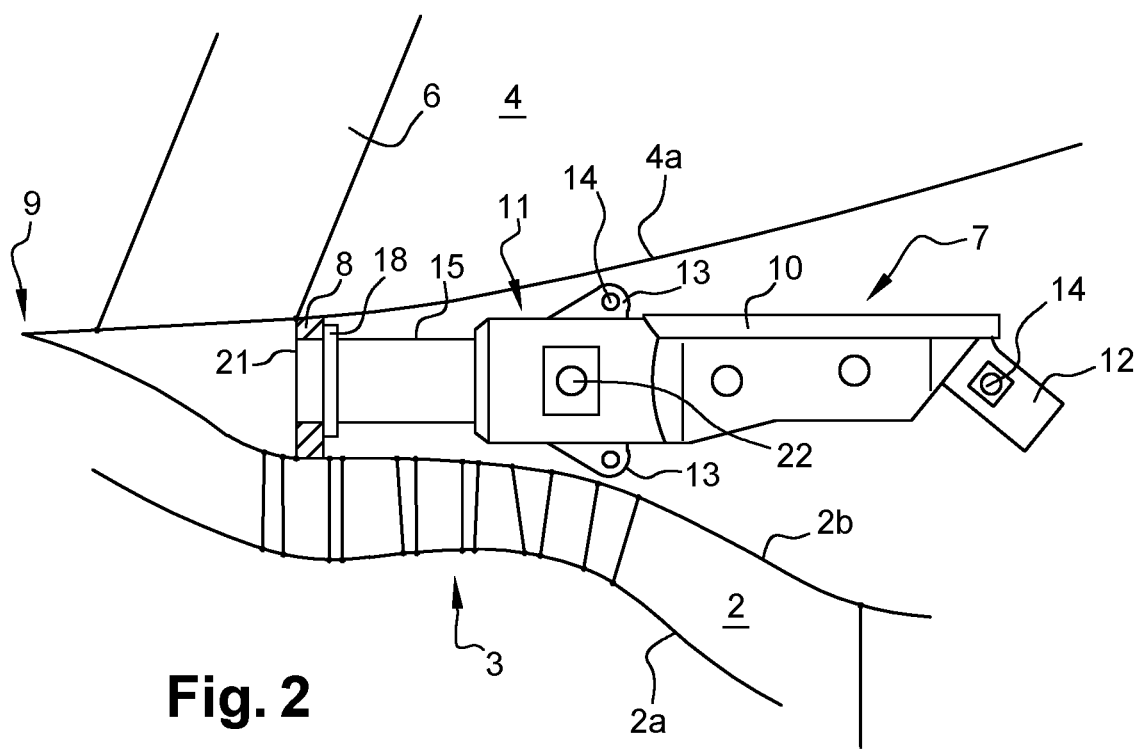
FIG. 2 is a detail of FIG. 1, showing the mounting of the suspension system according to the invention in the turbojet.
Figure 3:
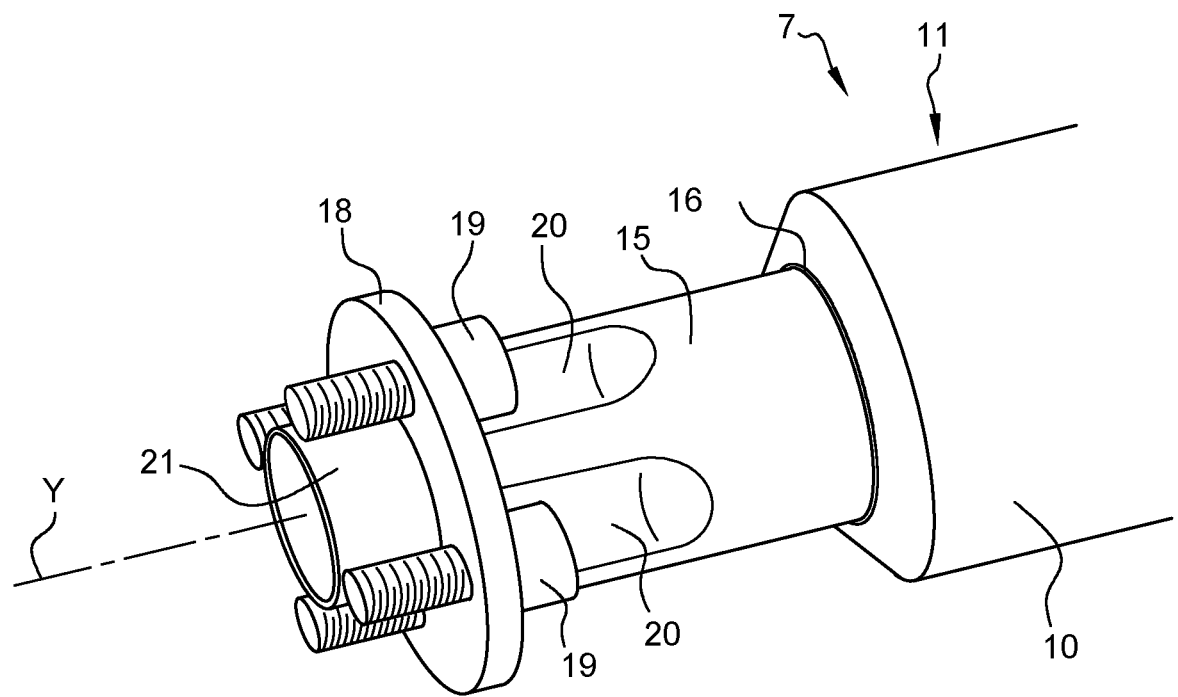
FIG. 3 is a perspective view of the upstream part of the suspension system.
Figure 4:
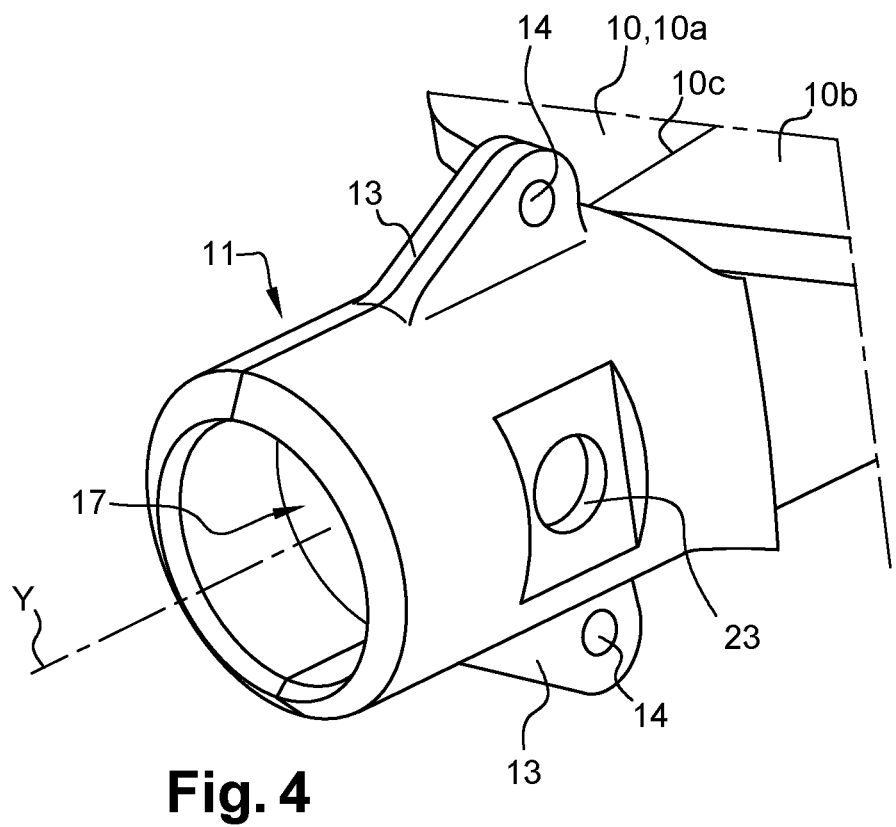
FIG. 4 is a perspective view of the upstream part of the beam, forming in particular the body of the ball joint housing.

The beam 10 extends generally axially and comprises two parts 10a, 10b (FIG. 4) symmetrical to each other, with respect to a radial plane and bearing against each other at a plane junction area 10c. The beam 10 has an upstream part forming a body 11 of a ball joint housing, and a rear part having an oblique cylindrical pin 12 (FIG. 2), extending radially inwards. The said pin 12 is used to mount a spreader bar not shown here.

Each part 10a, 10b of the beam 10 comprises, at the level of said upstream area defining the body 11, radially internal and external flanges 13, respectively. The flanges 13 and the pin 12 are provided with holes 14 for the engagement of bolts to secure the two parts 10a, 10b of the beam 10 to each other.

Figure 5:
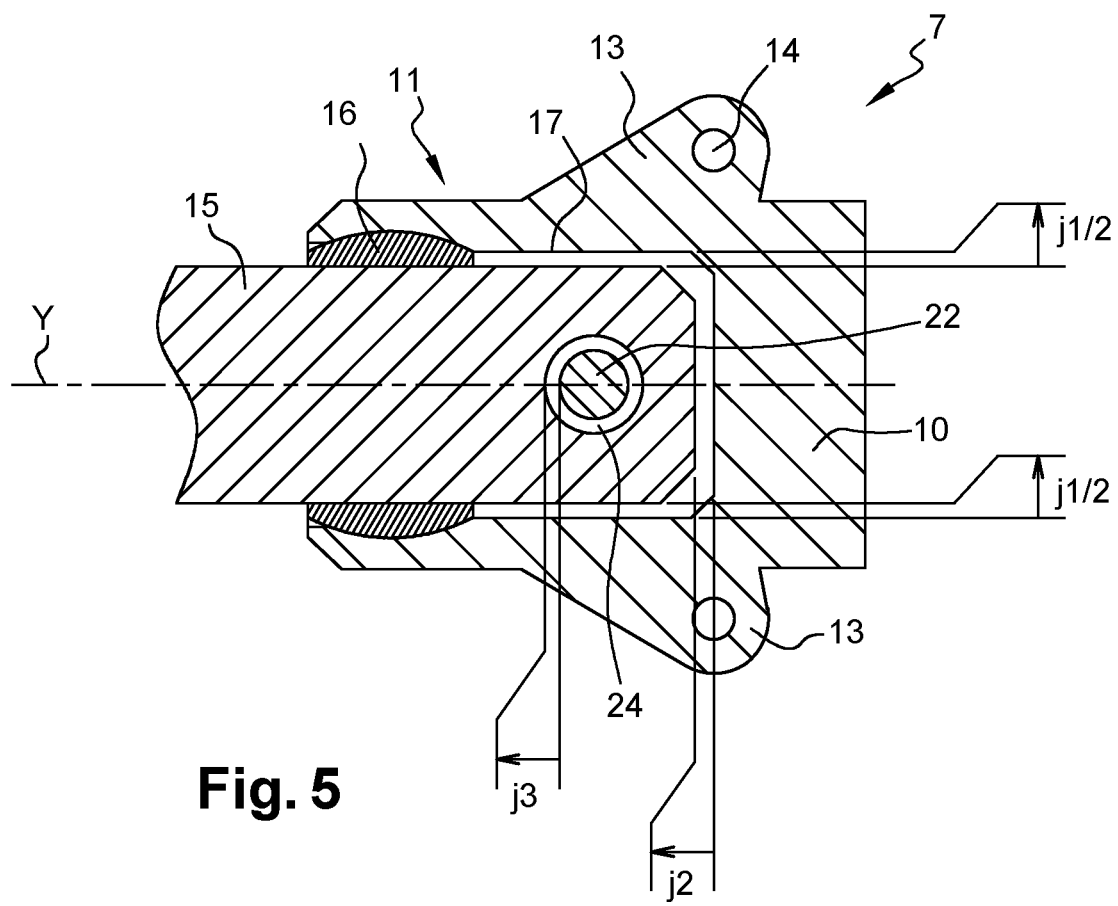
FIG. 5 is an axial sectional view of the upstream part of the suspension system.

The assembly 7 also comprises a cylindrical part 15, of axis Y, articulated on the body 11, by means of a ball joint nut 16 (FIG. 5).

The ball joint nut 16 has a spherical external surface mounted in a complementary shaped housing of the body 11. The body 11 and the ball joint nut 16 form the ball joint housing. The ball joint nut 16 has a central hole in which the cylindrical part is engaged. The diameter of the centre hole of the ball joint nut 16 substantially corresponds to the external diameter of the cylindrical part 15. The cylindrical part 16 is pivotally mounted about its Y axis in the ball joint nut 16.

The downstream end of the cylindrical part 16 is mounted in a housing 17 of the body 11, with a clearance j1 oriented perpendicularly to the axis of the cylindrical part 16, and with a clearance j2 oriented according to the axis of the cylindrical part 16.

The clearance j1 is for example between 1 mm and 10 mm. The clearance j2 is for example between 1 mm and 10 mm. The clearances j1 and j2 allow the rotation of the cylindrical part 16 according to two axes of rotation orthogonal to the Y axis of the said cylindrical part 16. The rotation permitted by these clearances, of the cylindrical part 16 in the body 11, according to each of these two axes, is for example between 2 and 10°.

The cylindrical part 16 further comprises a collar 18 intended to be attached to the interface 8, by means of screws 19.

A recessed area 20 is located opposite each screw 19, each recessed area 20 being provided downstream of the collar 18. Each recessed area 20 allows the engagement of the corresponding screw 19, in particular the screw head and/or the corresponding screwing tool.

The cylindrical part 16 further comprises a cylindrical upstream end 21 located upstream of the collar 18, intended to engage in a housing of complementary shape of the interface 8, so as to achieve centring and/or the passage of force between the said cylindrical part 16 and the said interface 8.

The system 7 further comprises a connecting element 22, here in the form of a cylindrical rod, mounted with clearance j3 in circular holes 23 (FIG. 4) in the body 11 and in a hole 24 of FIG. 5) in the cylindrical part 16.

The said connecting element 22 is thus configured to implement a Fail-Safe function. The connecting element 22 is thus able to transmit forces, by contact with the cylindrical part 16 and/or with the beam 10, in the event of taking up the aforementioned play j3 due to a failure. The clearance j3 is for example between 1 and 10 mm.

The invention claimed is:

1. A suspension system for a turbomachine, comprising a beam intended to be attached to a pylon of an aircraft, and a cylindrical part articulated on a ball joint housing, the ball joint housing comprising a body and a ball joint nut articulated on the body, the cylindrical part being mounted so as to pivot about its axis in the ball joint nut, characterized in that the cylindrical part is intended to be integral with a fixed part of the turbomachine, the body of the ball joint housing being integral with the beam.

2. A system according to claim 1, characterized in that the cylindrical part is mounted, at least in part, in a housing of the body, a clearance being provided between the said cylindrical part and the body.

3. A system according to claim 1, characterized in that it comprises a connecting element mounted in the body and mounted with clearance in the cylindrical part, the said clearance being permitted in particular according to the direction of the axis of the cylindrical part.

4. A system according to claim 2, characterized in that it comprises a connecting element mounted in the body and mounted with clearance in the cylindrical part, the said clearance being permitted in particular according to the direction of the axis of the cylindrical part.

5. A system according to claim 1, characterized in that the beam comprises an upstream part at which the ball joint housing is located, and a downstream part used for attaching a spreader bar intended to support force-recovery rods.

6. A system according to claim 2, characterized in that the beam comprises an upstream part at which the ball joint housing is located, and a downstream part used for attaching a spreader bar intended to support force-recovery rods.

7. A system according to claim 3, characterized in that the beam comprises an upstream part at which the ball joint housing is located, and a downstream part used for attaching a spreader bar intended to support force-recovery rods.

8. A system according to claim 1, characterized in that the cylindrical part comprises a collar, the said collar being intended to be attached to the fixed part of the turbomachine.

9. A system according to claim 2, characterized in that the cylindrical part comprises a collar, the said collar being intended to be attached to the fixed part of the turbomachine.

10. A system according to claim 3, characterized in that the cylindrical part comprises a collar, the said collar being intended to be attached to the fixed part of the turbomachine.

11. A system according to claim 5, characterized in that the cylindrical part comprises a collar, the said collar being intended to be attached to the fixed part of the turbomachine.

12. A system according to claim 8, characterized in that the cylindrical part comprises at least one recessed area intended to be located opposite a screw, the said recessed area being arranged downstream of the collar.

13. A system according to claim 8, characterised in that the cylindrical part has a cylindrical upstream end located upstream of the collar.

14. A system according to claim 12, characterised in that the cylindrical part has a cylindrical upstream end located upstream of the collar.

15. A double-flow turbojet comprising a flow vein of a primary flow, known as the primary vein, delimited by a radially internal wall and a radially external wall, and a flow vein of a secondary flow, known as the secondary vein, surrounding the primary vein and delimited by a radially internal wall and a radially external wall characterised in that it comprises a suspension system according to claim 11, and in that the cylindrical part is attached to a fixed part of the turbojet, situated radially between the internal wall of the secondary vein and the external wall of the primary vein, the said fixed part being integral with at least one of the said walls.

16. A double-flow turbojet comprising a flow vein of a primary flow, known as the primary vein, delimited by a radially internal wall and a radially external wall, and a flow vein of a secondary flow, known as the secondary vein, surrounding the primary vein and delimited by a radially internal wall and a radially external wall characterised in that it comprises a suspension system according to claim 2, and in that the cylindrical part is attached to a fixed part of the turbojet, situated radially between the internal wall of the secondary vein and the external wall of the primary vein, the said fixed part being integral with at least one of the said walls.

17. A double-flow turbojet comprising a flow vein of a primary flow, known as the primary vein, delimited by a radially internal wall and a radially external wall, and a flow vein of a secondary flow, known as the secondary vein, surrounding the primary vein and delimited by a radially internal wall and a radially external wall characterised in that it comprises a suspension system according to claim 3, and in that the cylindrical part is attached to a fixed part of the turbojet, situated radially between the internal wall of the secondary vein and the external wall of the primary vein, the said fixed part being integral with at least one of the said walls.

18. A turbojet according to claim 15, characterised in that the secondary vein comprises at least one arm extending radially between the internal and external walls of the secondary vein, the said arm being situated downstream of a fan of the turbojet, the fixed part to which the said cylindrical part is attached being situated axially opposite the arm.

19. A turbojet according to claim 15, characterised in that the dilution ratio of the said turbojet is greater than 10.

20. A turbojet according to claim 18, characterised in that the dilution ratio of the said turbojet is greater than 10.

* * * * *